United States Patent [19]
Koshida et al.

[11] Patent Number: 6,065,793
[45] Date of Patent: May 23, 2000

[54] VEHICLE SUN ROOF APPARATUS

[75] Inventors: Masayuki Koshida, Toyota; Junya Suzuki, Kariya; Kenichi Fukura, Toyota, all of Japan

[73] Assignee: Aisin Seiki Kabushiki Kaisha, Kariya, Japan

[21] Appl. No.: 09/057,504

[22] Filed: Apr. 9, 1998

[30] Foreign Application Priority Data

Apr. 9, 1997 [JP] Japan ................................. 9-105417

[51] Int. Cl.$^7$ ........................................................ B60R 5/00
[52] U.S. Cl. .................................. 296/37.1; 296/216.04; 224/311
[58] Field of Search ............................. 296/37.1, 37.7, 296/37.8, 210, 216.01, 216.04; 224/309, 311, 281

[56] References Cited

U.S. PATENT DOCUMENTS

| | | | |
|---|---|---|---|
| 3,016,263 | 1/1962 | Rehmann | 296/216.04 |
| 4,101,159 | 7/1978 | Stewart | 296/37.7 |
| 4,114,945 | 9/1978 | Lutz | 296/216.04 X |
| 4,161,336 | 7/1979 | LeVan | 296/218 |
| 4,274,672 | 6/1981 | Kuroda | 296/216.04 X |
| 4,738,481 | 4/1988 | Watjer et al. | 296/37.8 |
| 4,818,010 | 4/1989 | Dillon | 296/37.7 |
| 5,303,970 | 4/1994 | Young et al. | 296/37.7 |

FOREIGN PATENT DOCUMENTS

| | | | |
|---|---|---|---|
| 411581 | 2/1991 | European Pat. Off. | 296/37.8 |
| 3-33712 | 4/1991 | Japan. | |
| 6-166327 | 6/1994 | Japan. | |

*Primary Examiner*—D. Glenn Dayoan
*Assistant Examiner*—Jason Morrow
*Attorney, Agent, or Firm*—Burns, Doane, Swecker & Mathis, LLP

[57] ABSTRACT

A vehicle roof apparatus includes an overhead console that is slidably supported with respect to guide rails disposed along opposite sides of the opening in the vehicle roof. In one embodiment, the console is supported on the guide rails by frames, and sunshades are slidably supported in the frames. The sunshades are thus able to move with sliding movement of the overhead console, but are able to slidably move independent of the console. In another embodiment, the overhead console is slidably supported on the guide rails by the sunshades, with the console and the sunshades being movable together as a unit. In a further embodiment, the overhead console is supported on the guide rails by a supporting member, and the sunshades are slidably mounted on the console and the guide rails so that the console and the sunshades can be moved independently of one another.

17 Claims, 6 Drawing Sheets

6,065,793

VEHICLE SUN ROOF APPARATUS

FIELD OF THE INVENTION

The present invention generally relates to a vehicle sun roof apparatus. More particularly, the present invention pertains to a vehicle sun roof apparatus which is equipped with a sliding panel, paired sunshades and an overhead console.

BACKGROUND OF THE INVENTION

Up to the present time, a typical vehicle sun roof has consisted of an opening in the roof of a vehicle, a movable sliding panel for opening and closing the opening in the roof and a movable sunshade to expose and cover the sliding panel. In these sun roofs, the sliding panel and the sunshade are slidably guided upon guide rails disposed on the side edges of the opening in the roof of the vehicle. Examples of this type of sun roof are disclosed in Unexamined Published Japanese Utility Model Application No. 3-33712 and Unexamined Published Japanese Patent Application No. 6-166327.

In the latter example, a rail on which the sunshade is slidably mounted extends from a rail for slidably mounting the slide panel. These rails are mounted in parallel fashion along opposite sides of the edge of a roof opening positioned towards a center of the vehicle roof, whereby the sliding panel and the sunshade are able to slide independently along the rails.

In certain types of vehicles, for instance sports utility vehicles, an overhead console is oftentimes mounted on the ceiling of the vehicle. Extreme difficulties arise, however, when attempting to equip the vehicle with an overhead console and a sun roof simultaneously, because the overhead console imposes a significant limitation on the range of movement of the sliding panel of the sun roof. For this reason, as in the case of the Ford Explorer for example, a small-sized overhead console is fixed at a forward position of the ceiling while the sliding panel of the sun roof is positioned immediately behind the overhead console.

Thus, in those vehicles where the overhead console has been mounted on the ceiling together with the sun roof, as in the Ford Explorer, the overhead console that can be mounted is limited to one which is relatively small in length. As a result, it is difficult to utilize such arrangement in a variety of different types of vehicles.

It would therefore be desirable to provide a sun roof apparatus and an overhead console that can be mounted in a variety of different types of vehicles and that would not limit the size of a relatively large sun roof and the overhead console.

SUMMARY OF THE INVENTION

In accordance with the present invention, a vehicle roof apparatus incorporates both a vehicle sun roof and an overhead console. The console slides back and forth integrally with frame elements, as an incorporated component of the vehicle roof apparatus. The frame elements are slidably supported on guide rails which are disposed adjacent the longitudinally extending opposite sides of the opening in the vehicle roof. A slidably movable sliding panel allows the roof opening to be open or closed. Additionally, sunshades are slidably supported in the frame elements on opposite sides of the overhead console.

This construction enables independent movements of the slide panel and the sunshades, and also allows each of the sunshades to be moved independently of each other and independently of the overhead console. The forward and backward movements of the overhead console cause concurrent movement of the frame elements containing each of the sunshades. Because the sunshade for use on the driver's side and that for use on the passenger's side are made independent from each other, they can be moved by the driver or the passenger independently.

Because the overhead console has the ability to move backward, this allows the vehicle roof opening to be made longer, despite even a relatively long overhead console being mounted thereon. Also, because the overhead console is supported by the frame elements, both strength and safety of the console mounting are enhanced.

According to another aspect of the present invention, a vehicle roof apparatus includes a pair of guide rails disposed along longitudinally extending sides of the opening in the roof of a vehicle, a pair of sunshades each slidably mounted on one of the guide rails, and an overhead console positioned between the sunshades and fixed to the sunshades for slidable movement with respect to the guide rails.

In accordance with another aspect of the present invention, a vehicle roof apparatus includes a pair of guide rails disposed adjacent longitudinally extending sides of the opening in the roof of a vehicle, a supporting member supported on the guide rails for sliding movement along the guide rails, an overhead console supported by the supporting member for sliding movement relative to the guide rails, and a pair of sunshades each slidably mounted between the overhead console and one of the guide rails for slidably moving independently of the overhead console.

A further aspect of the present invention involves a vehicle roof apparatus that includes a pair of guide rails disposed along opposite longitudinally extending sides of the opening in the roof of a vehicle, and an overhead console slidably supported with respect to the guide rails for sliding movement in a forward and backward directions with respect to the guide rails.

BRIEF DESCRIPTION OF THE DRAWINGS

Additional details associated with the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
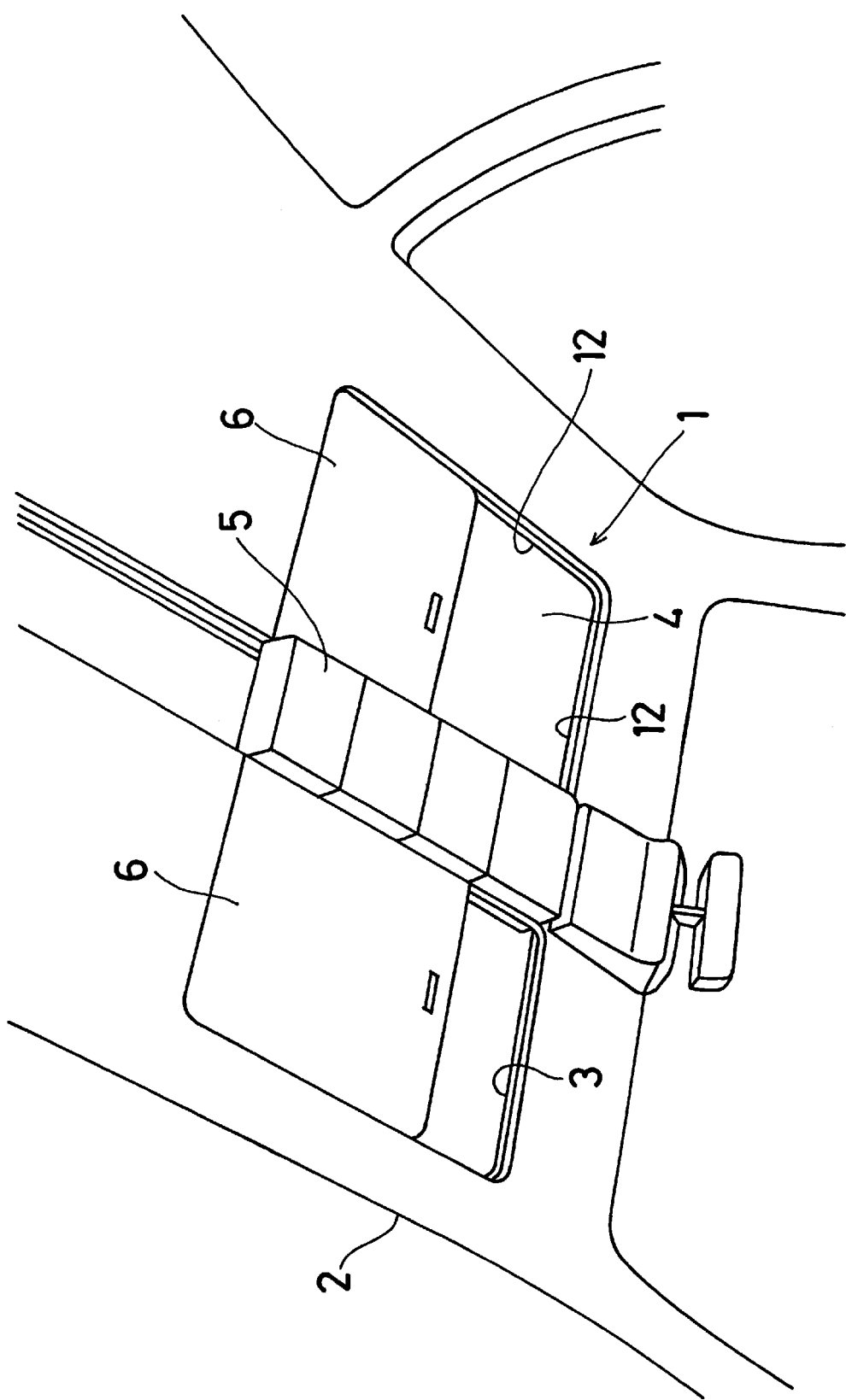
FIG. 1 is a perspective view of the interior of the roof of a vehicle illustrating the sun roof apparatus according to an embodiment of the present invention.

With reference to FIG. 1, the roof 2 of a vehicle is provided with an opening 3 that is adapted to receive a sun roof apparatus in accordance with the present invention. The vehicle sun roof apparatus includes a sun roof 1 and an overhead console 5. The overhead console 5 is disposed in the central part of the roof. The overhead console 5 can include openable and closable compartments in a known manner.

Figure 2:
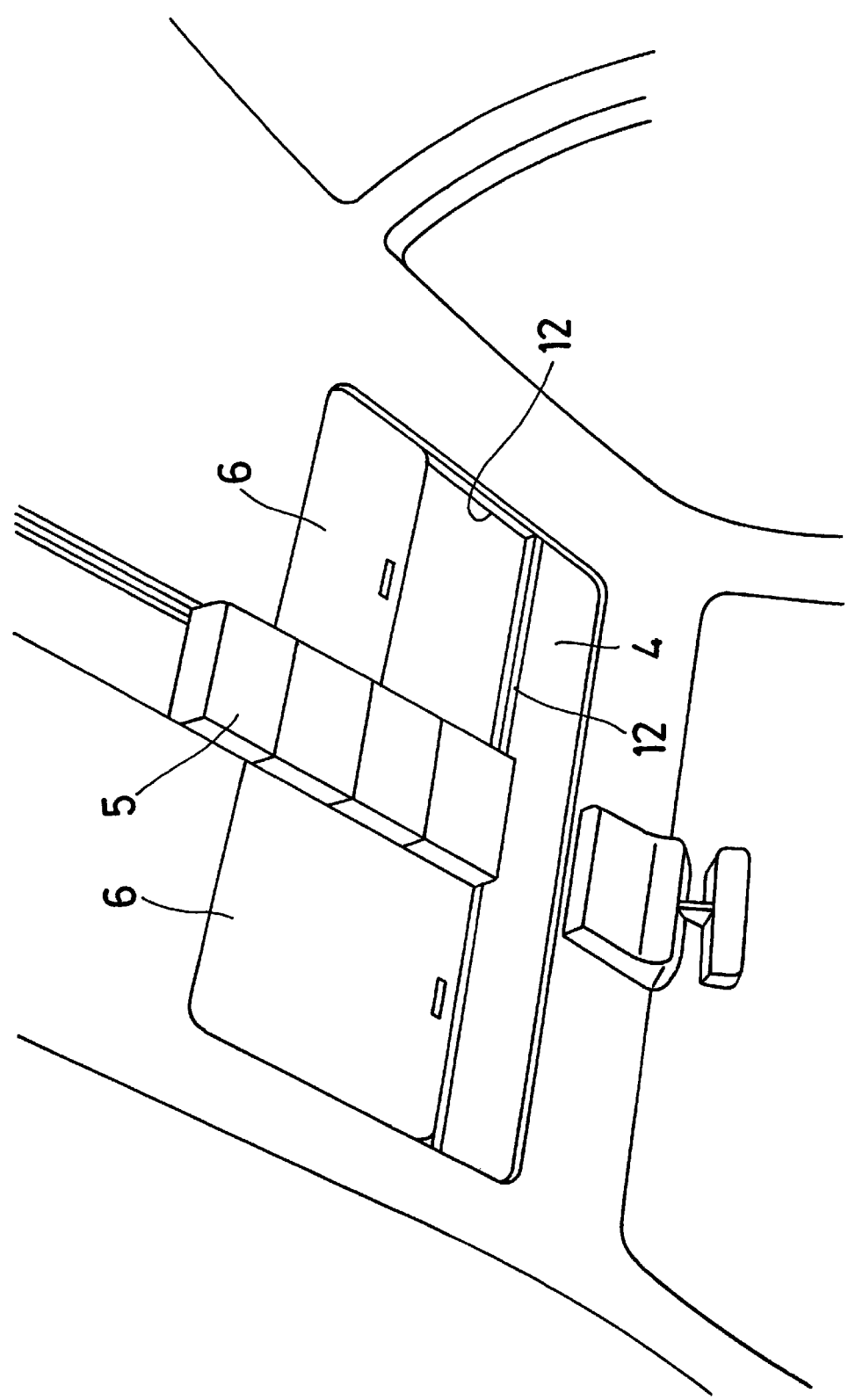
FIG. 2 is a perspective view similar to FIG. 1 illustrating the overhead console and sunshades after they have been partially moved backwards.

The sun roof 1 comprises a slide panel 4, and a pair of sunshades 6, 6 disposed on opposite sides of the overhead console 5. The slide panel 4 is positioned above the sunshades 6, 6 and is freely slidable in the back-and-forth directions of the vehicle by known means. The sliding panel 4 is made of glass or synthetic resin and is transparent for allowing sunshine to pass through the slide panel into the vehicle interior. The sunshades 6 are positioned interiorly of the sliding panel 4 towards the interior of the vehicle and are movable between opened and closed positions to uncover and cover the sliding panel 4 to alternatively permit and prevent sunshine from entering the vehicle interior through the sliding panel 4. The overhead console 5, which extends downwardly below the surface of the sunshades 6, 6 is also freely slidable in the back-and-forth directions as illustrated in FIG. 2. The sunshades 6, 6 are able to move together with the overhead console 5 when the overhead console 5 is moved. However, the sunshades 6, 6 are able to be slidably moved back and forth independently from the overhead console 5.

Figure 3:
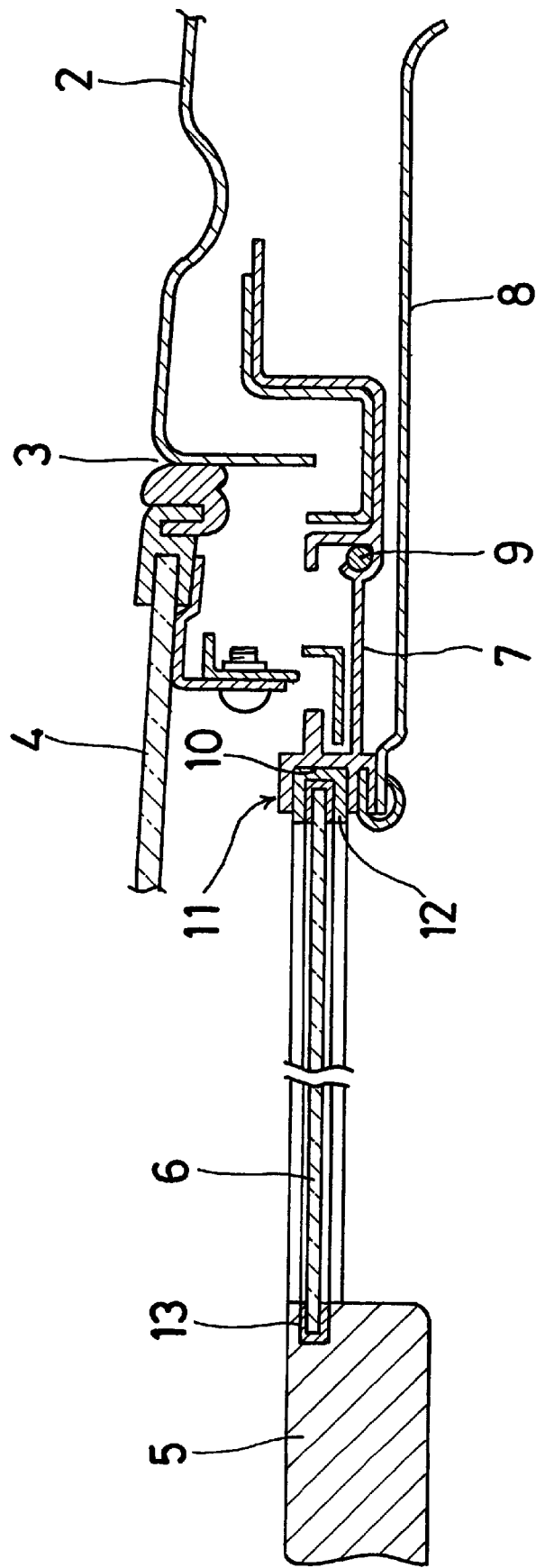
FIG. 3 is a cross-sectional view of a sun roof apparatus according to the embodiment of the present invention shown in FIG. 1.
Figure 4:
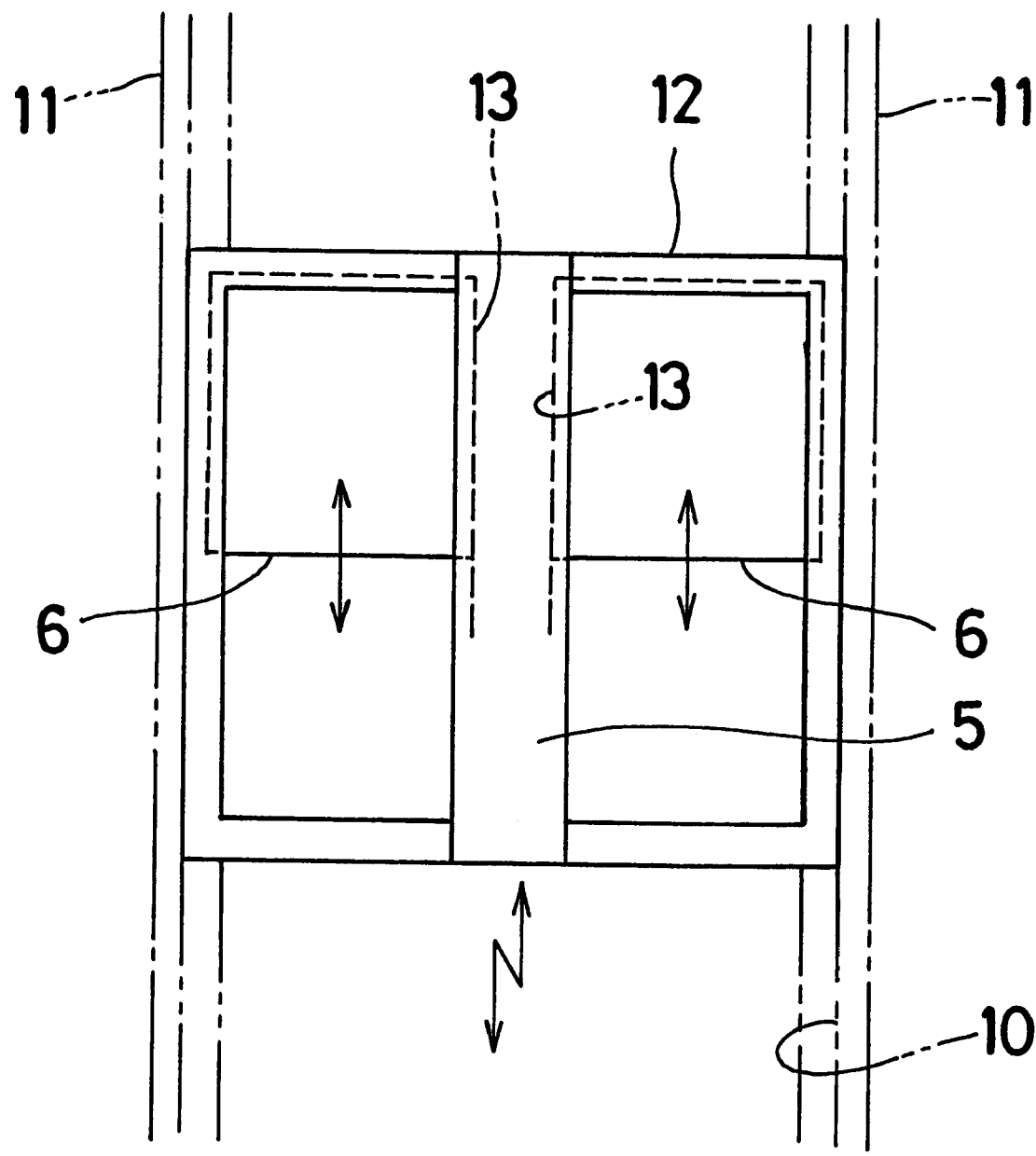
FIG. 4 is a plan view of the interior of the roof of a vehicle illustrating the construction of the embodiment of the sun roof apparatus according to the present invention shown in FIG. 1.

Referring to FIGS. 3 and 4, as noted above, the sliding panel 4 is adapted to be moved back and forth by known means. A pair of drive rails 7 is disposed on opposite sides of the vehicle opening 3, specifically on the opposite inner sides of the head lining 8, for permitting sliding movement of the sliding panel 4. The sliding panel 4 is slidably positioned on the drive rails 7. A shoe is integrally associated with the sliding panel 4. The shoe is connected to a cable 9 so that the forward or backward movement of cable 9 causes corresponding forward or backward movement of the sliding panel 4. The movement of the cable 9 for achieving movement of the sliding panel 4 is effected in a known manner.

The inner side surface of the drive rails 7 is provided with a groove 10 that is open inward. These grooves 10 define guide rails 11 that extend longitudinally along the opposite sides of the opening in the roof.

A pair of frame members 12 that are generally rectangular in configuration support the overhead console 5 on opposite sides of the console 5. The frame members 12 together define a frame. The frame members 12, which can be constructed of an extruded aluminum alloy, possess a generally U-shaped cross-section section as seen in FIG. 3. Each of the frame members 12 is freely slidably assembled in one of the grooves 10 of the guide rails 11. Because the frame members 12 are fixed to the overhead console 5, the frame members 12 and the console 5 move together as a unit.

By this construction, the overhead console 5 can be moved back and forth by moving the integral frame members 12 back and forth along the guide rails 11.

Externally oriented grooves 13 are provided on both side surfaces of the overhead console 5. These grooves 13 each receive one of the sides of the respective sunshades 6 and allow the sunshades 6 to move relative to the overhead console 5. The opposite side of each respective sunshade 6 is received in a groove formed in one of the frame members 12 as seen in FIG. 3. The sunshades 6 are able to slide along the grooves 13 in the overhead console 5 and the grooves in the frame members 12. As a result, the sunshades 6, 6 are movable back and forth independently from the overhead console 5.

Thus, in accordance with the embodiment illustrated in FIGS. 1–4, it is possible to slide the overhead console 5 and the sunshades 6, 6 together because the frame members 12 are connected to the overhead console 5 and the sunshades 6, 6 are mounted in the frame members 12. Further, it is possible to slide the sunshade 6, 6 relative to the overhead console 5 because the sunshades 6, 6 are slidably mounted in the frame members 12. By virtue of this construction, the vehicle roof is provided with an overhead console and a sun roof, but the size of the overhead console 5 is not limited.

Figure 5:
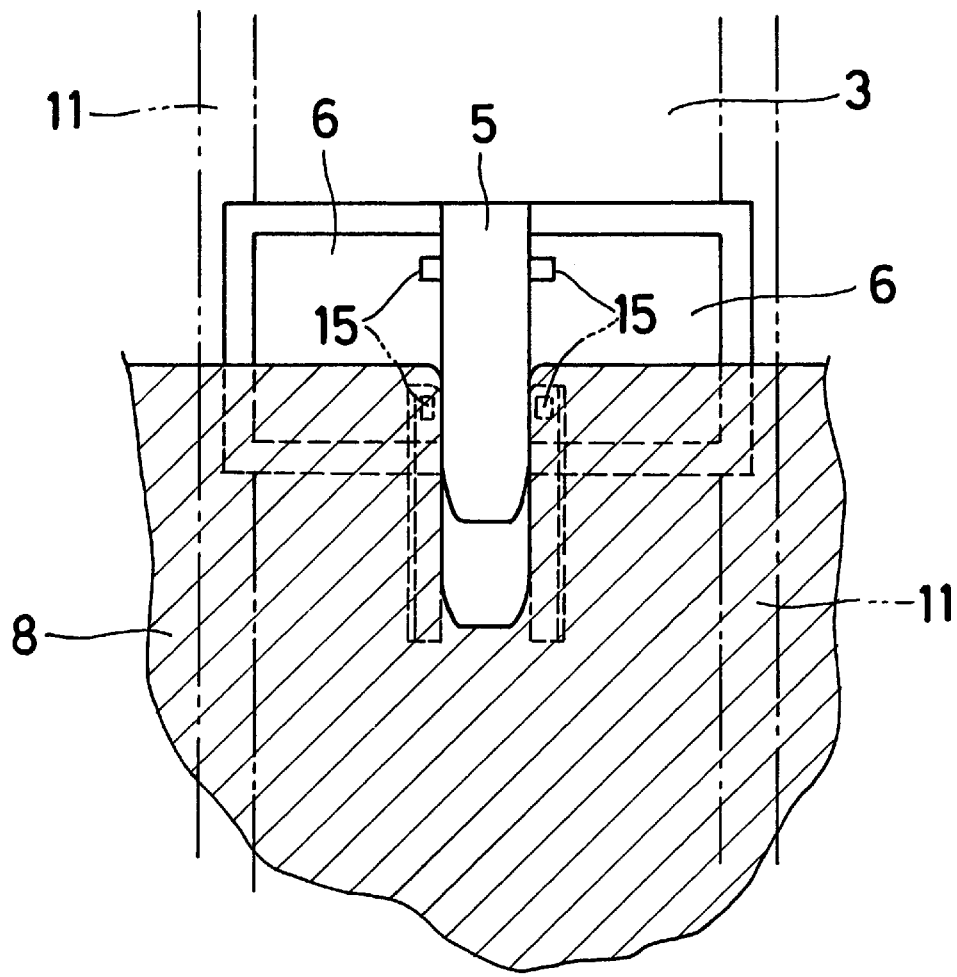
FIG. 5 is a plan view similar to FIG. 4, but illustrating another embodiment of the sun roof apparatus according to the present invention.
Figure 6:
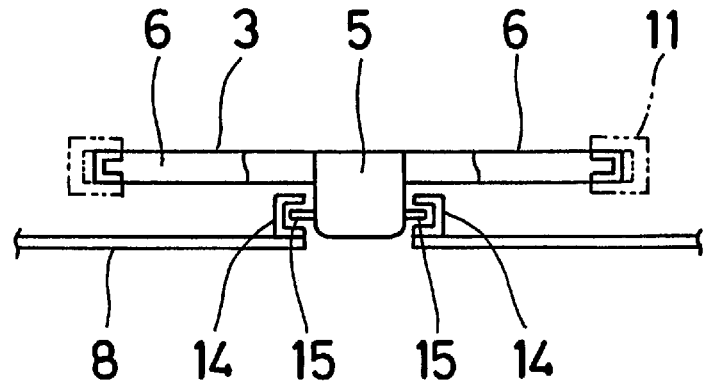
FIG. 6 is a front view of the embodiment of the sun roof apparatus shown in FIG. 5.

In FIGS. 5 and 6 there is illustrated another embodiment of the sun roof apparatus of the present invention. In this embodiment, a sunshade 6 is positioned on each of the opposite sides of a centrally located overhead console 5. One side of each sunshade 6 is connected to the overhead console 5 and the opposite side of each sunshade is disposed in one of the guide rails 11 disposed along longitudinally extending opposite sides of the opening 3 in the roof of the vehicle. The sunshades 6, with the overhead console 5, are able to freely slide on the guide rails 11.

In addition, a pair of rails 14 are fixed to the head lining 8. A plurality of shoes 15 are fixed to and extended outwardly from the sides of the overhead console 5. These shoes 5 are positioned in the rails 14 that are fixed to the head lining 8 to thereby facilitate smooth movement of the overhead console 5. In this embodiment, by moving or sliding the overhead console 5 backward, the sunshades 6 are also moved or slid simultaneously. In other words, the overhead console 5 and the sunshades 6 are moved or slid back and forth as a unit. In the illustration of FIG. 5, the sunshades 6 are shown as being in a partially open position.

In the embodiment shown in FIGS. 5 and 6, the vehicle is once again provided with an overhead console 5 and a sun roof, yet the size of the overhead console is not limited by the presence of the sunshades.

Figure 7:
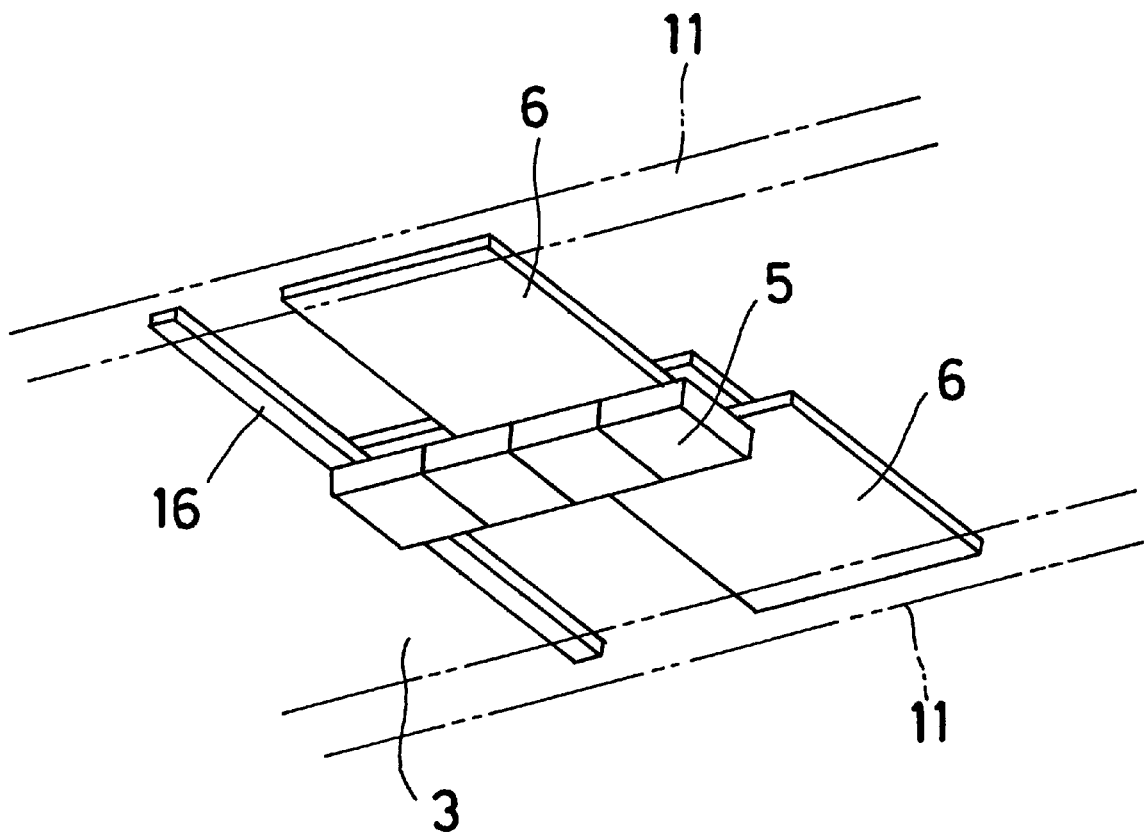
FIG. 7 is a perspective view of the interior of the roof of a vehicle illustrating still another embodiment of the sun roof apparatus according to the present invention.

As illustrated in FIG. 7 which depicts a further embodiment of the invention, a supporting member 16 is freely slidably disposed on the guide rails 11 that are positioned along the longitudinally extending opposite sides of the opening in the vehicle roof. A forward end portion of the overhead console box 5 is fixed to a central part of this supporting member 16. Positioned on either side of the overhead console 5 is a pair of sunshades 6, 6 each of which is movable or slidable independently of one another. In addition, the sunshades 6, 6 are movable or slidable with respect to the overhead console 5.

One side of each sunshade 6 is freely slidably supported by the corresponding guide rail 11 while the opposite side of each sunshade 6 is freely slidably supported in respective grooves provided on opposite sides of the overhead console box 5. As a result, the paired sunshades 6 can each be moved or slid independent from the overhead console box 5 and can also be moved or slid independently of one another. Further, the overhead console 5 can be moved or slid longitudinally along the rails 11.

In the embodiment shown in FIG. 7, with the overhead console 5 in the forwardmost position (i.e., to the left in FIG. 7) and the sunshades 6, 6 in the fully closed position, the overhead console 5 can be moved or slid backward (i.e., to the right in FIG. 7) and this causes the sunshades 6, 6 to also move or slide backward to the open position at which the overlying sliding panel (i.e., glass or plastic panel) is exposed. Thereafter, the overhead console 5 can be moved or slid forward towards the closed position. This forward sliding movement of the overhead console 5 does not result in corresponding movement of the sunshades 6, 6, and so the sunshades 6, 6 can be moved forward independently of the overhead console 5.

The embodiment of the present invention shown in FIG. 7 advantageously allows a sun roof arrangement to be provided in conjunction with an overhead console, without the need for significantly limiting the size of the overhead console.

It is to be understood that although the illustrations in FIGS. 5–7 do not depict the transparent sliding panel that opens and closes the opening in the vehicle roof, such a movable sliding panel similar to the sliding panel 4 shown in FIGS. 1–4 is provided at a position above the sunshades 6.

In each of the embodiments, the overhead console is slidably supported by and movable with respect to guide rails extending longitudinally adjacent the roof opening 3. This way, the sun roof, including the sunshades, can be provided along with the overhead console without having to use an overhead console of limited size and without restricting the location of the sun roof.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle roof apparatus comprising:
   a guide rail disposed adjacent a longitudinally extending side of an opening in a roof of a vehicle;
   a frame member slidably mounted on the guide rail;
   a longitudinally extending console connected to the frame member for being slidably moved along the guide rail; and
   a movable slide panel extending across the opening in the roof of the vehicle for movement between an open position and a closed position.

2. A vehicle roof apparatus according to claim 1, including a pair of guide rails disposed along longitudinally extending sides of the opening in the roof of a vehicle, and a pair of frame members each slidably mounted in one of the guide rails and connected to the overhead console, and a pair of sunshades each slidably mounted in one of the frame members.

3. A vehicle roof apparatus according to claim 2, wherein each frame member includes a groove that receives a side portion of one of the sunshades.

4. A vehicle roof apparatus according to claim 1, including a sunshade slidably mounted in the frame member.

5. A vehicle roof apparatus according to claim 1, wherein the guide rail forms a portion of a drive rail along which the slide panel is slidably moved.

6. A vehicle roof apparatus comprising:
   a pair of guide rails disposed along longitudinally extending sides of an opening in a roof of a vehicle;
   a pair of sunshades each slidably mounted on one of the guide rails; and
   an overhead console positioned between the sunshades and fixed to the sunshades for slidable movement with respect to the guide rails.

7. A vehicle roof apparatus according to claim 6, including a plurality of shoes extending from the overhead console and a pair of rails which support the shoes.

8. A vehicle roof apparatus comprising:
   a pair of guide rails disposed adjacent longitudinally sides of an opening in a roof of a vehicle;
   a supporting member supported on the guide rails for sliding movement along the guide rails;
   an overhead console supported by the supporting member for sliding movement relative to the guide rails; and
   a pair of sunshades each slidably mounted between the overhead console and are of the guide rails for slidably moving independently of the overhead console.

9. A vehicle roof apparatus according to claim 8, wherein the supporting member is fixed to the overhead console at one end of the overhead console.

10. A vehicle roof apparatus according to claim 8, wherein the sunshades are slidably mounted in grooves in the overhead console.

11. A vehicle roof apparatus comprising:
    a pair of guide rails disposed along opposite longitudinally extending sides of an opening in a roof of a vehicle; and
    an overhead console slidably supported with respect to the guide rails by a supporting member for sliding movement in a forward and backward directions with respect to the guide rails.

12. A vehicle roof apparatus according to claim 11, wherein the supporting member includes a pair of frame members each fixed to the overhead console and extending from opposite sides of the overhead console, said frame members being supported in the guide rails for sliding movement.

13. A vehicle roof apparatus according to claim 12, including a pair of sunshades each slidably disposed in one of the frame members for sliding movement relative to the overhead console.

14. A vehicle roof apparatus according to claim 11, including a pair of sunshades each connected to the overhead console and supported by one of the guide rails for sliding movement with the overhead console along the guide rails.

15. A vehicle roof apparatus according to claim 11, including a movable transparent sliding panel positioned above the overhead console for movement between open and closed positions to open and close the opening in the roof of the vehicle.

16. A vehicle roof apparatus according to claim 11, wherein the supporting member is fixed to the overhead console and slidably disposed on the guide rails.

17. A vehicle roof apparatus according to claim 16, wherein the overhead console includes grooves disposed along opposite sides of the overhead console, and including a pair of sunshades each slidably mounted on one of the guide rails and slidably mounted in one of the grooves in the overhead console.

* * * * *